United States Patent
Yu

(10) Patent No.: US 7,712,827 B2
(45) Date of Patent: May 11, 2010

(54) CYCLE SADDLE STRUCTURE

(75) Inventor: Tsai-Yun Yu, Taichung Hsien (TW)

(73) Assignee: International Bicycle Products Corporation, Tachia, Taichung Hsien (TW)

( * ) Notice: Subject to any disclaimer, the term of this patent is extended or adjusted under 35 U.S.C. 154(b) by 0 days.

(21) Appl. No.: 12/048,463

(22) Filed: Mar. 14, 2008

(65) Prior Publication Data

US 2009/0152912 A1 Jun. 18, 2009

(30) Foreign Application Priority Data

Dec. 14, 2007 (TW) ................ 96221326 U

(51) Int. Cl.
*B60N 2/38* (2006.01)
(52) U.S. Cl. .............. 297/195.1; 297/188.01; 297/188.11; 297/188.13; 224/427
(58) Field of Classification Search ........... 297/188.01, 297/188.08, 188.11, 188.13, 195.1; 224/427; 312/334.6, 334.23
See application file for complete search history.

(56) References Cited

U.S. PATENT DOCUMENTS

| | | | | |
|---|---|---|---|---|
| 655,209 | A | * | 8/1900 | Dooley ............... 297/188.08 |
| 2,057,374 | A | * | 10/1936 | Faulhaber ............ 297/188.13 |
| 2,093,912 | A | * | 9/1937 | Hayes et al. ......... 297/188.11 |
| RE21,080 | E | * | 5/1939 | De Boer .............. 312/246 |
| 4,967,435 | A | * | 11/1990 | Seals ................. 7/139 |
| 5,190,345 | A | | 3/1993 | Lin |
| 5,931,361 | A | * | 8/1999 | Schwimmer .......... 224/453 |
| 7,008,012 | B1 | * | 3/2006 | Chang ................ 297/188.1 |
| 7,625,041 | B2 | | 12/2009 | Bigolin |
| 2004/0238253 | A1 | * | 12/2004 | Yonehana et al. ..... 180/219 |
| 2006/0061156 | A1 | * | 3/2006 | Bigolin .............. 297/195.1 |

FOREIGN PATENT DOCUMENTS

| | | |
|---|---|---|
| DE | 32 31 305 | 2/1984 |
| DE | 3231305 A1 * | 2/1984 |
| EP | 1 413 504 | 4/2004 |
| FR | 1 248 870 | 12/1960 |
| FR | 2 774 965 | 2/1998 |
| WO | WO 2007/034422 | 3/2007 |
| WO | WO 2007/079626 | 7/2007 |

OTHER PUBLICATIONS

European Search Report dated Oct. 28, 2009.
English language translation of abstract and pertinent parts of FR 2 774 965.

* cited by examiner

*Primary Examiner*—Laurie K Cranmer
(74) *Attorney, Agent, or Firm*—Thomas, Kayden, Horstemeyer & Risley

(57) ABSTRACT

A cycle saddle structure comprising a base and a container is provided. The base has a front crotch portion and a rear supporting portion. The container is adapted to slide on the bottom portion of the rear supporting portion between an open position and a closed position with respect to the base.

11 Claims, 4 Drawing Sheets

CYCLE SADDLE STRUCTURE

This application claims the benefit of priority based on Taiwan Patent Application No. 096221326 filed on Dec. 14, 2007, the disclosure of which is incorporated herein by reference in its entirety.

CROSS-REFERENCES TO RELATED APPLICATIONS

Not applicable.

BACKGROUND OF THE INVENTION

1. Field of the Invention

The present invention relates to a cycle saddle structure, and particularly, relates to a cycle saddle structure having a containing space.

2. Descriptions of the Related Art

Even though technological developments have led to increased developments in advanced and diversified vehicles, cycles are still commonly used for both transportation and leisure sports.

However, there is limited carrying capacity on these cycles when compared to other vehicles. To address the rider's needs to carry his or her personal items, various cycle containers have emerged in the market. For example, bags that are bound to the cycle frame have been developed. These bags are generally bound to the bottom of the saddle to provide less interference with the riding. However, such a bag is typically fixed onto the cycle frame with a reusable adhering strip, which tends to get loose and makes it difficult to secure the bag onto the cycle frame. Furthermore, it is not made of a water-proof or anti-collision material, thus providing insufficient protection for the articles contained therein.

Another development that has been made is a design where an additional containing space is provided within the cycle saddle. In the products available at present, the saddle body is coupled to the saddle structure by an axle. Practically, the saddle body has to be rotated open to access the articles received therein. In other words, to open the containing space, the rider has to suspend the riding action and get off the cycle. Consequently, it is very inconvenient for the rider to access the articles during the ride.

In view of this, it is highly desirable in the art to provide a cycle saddle with a containing space that is convenient to access.

SUMMARY OF THE INVENTION

One objective of this invention is to provide a cycle saddle structure which has a containing space in itself. The containing space is coupled to the saddle structure and is capable of sliding open and closed. Therefore, the rider can access the articles received therein without having to turn over the saddle or stop and get off the cycle.

Another objective of this invention is to provide a cycle saddle structure having a containing space which is disposed at the bottom portion of a saddle to prevent interference with the ride. In the closed position, the container and the saddle are closely coupled together with a fastener, thus providing satisfactory protection, while holding the items inside.

The cycle saddle structure disclosed in this invention comprises a base and a container. The base has a front crotch portion and a rear supporting portion. The container is capable of sliding onto the rear supporting portion at the bottom portion so that the container is adapted to slide between an open position and a closed position with respect to the base.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
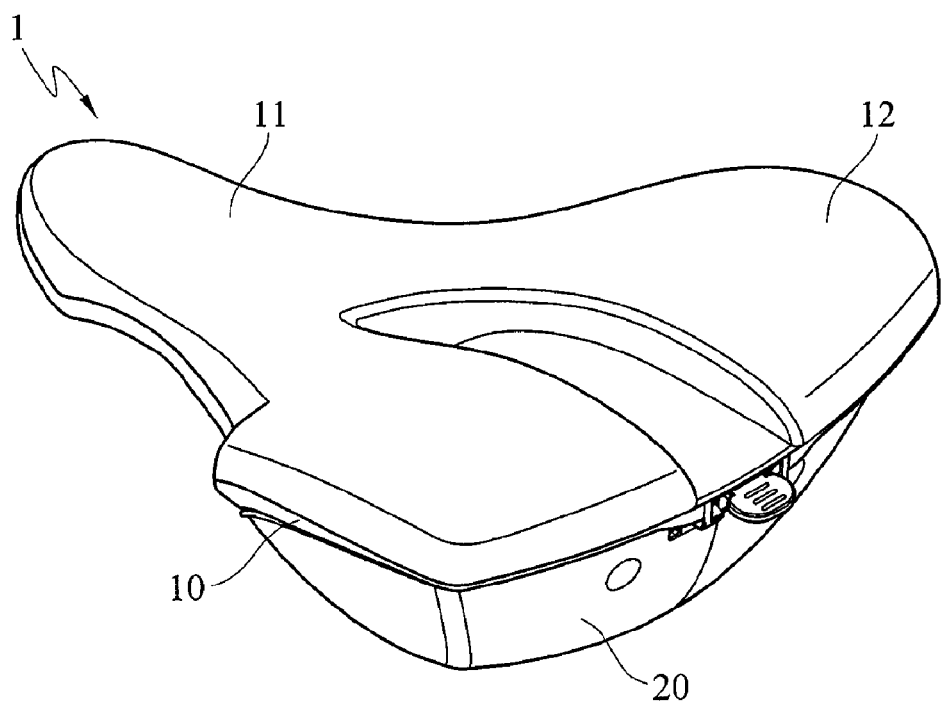
FIG. 1A is a top view of a cycle saddle structure of this invention in a closed position.
Figure 1B:
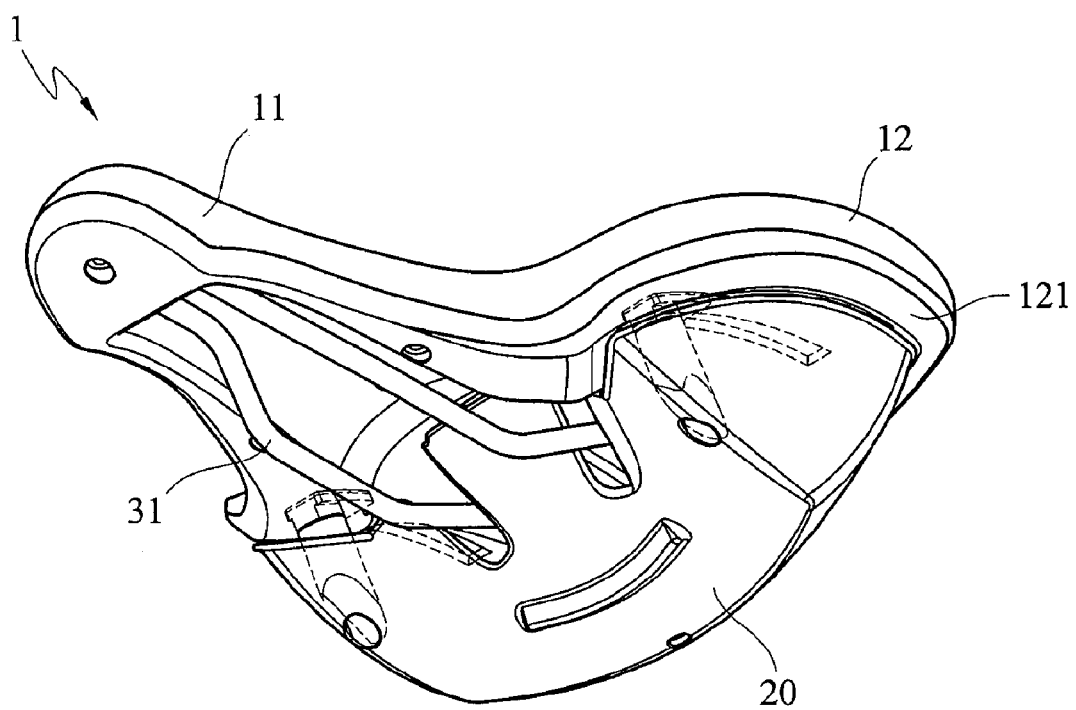
FIG. 1B is a bottom view of the cycle saddle structure of this invention in the closed position.

FIGS. 1A and 1B illustrate the cycle saddle structure 1 of this invention. The cycle saddle structure 1 mainly comprises a base 10 and a container 20. A top view and a bottom view of the container 20 in a closed position are depicted in FIG. 1A and FIG. 1B respectively. The base 10 can be divided into a front crotch portion 11 and a rear supporting portion 12 for rider comfort.

Figure 2A:
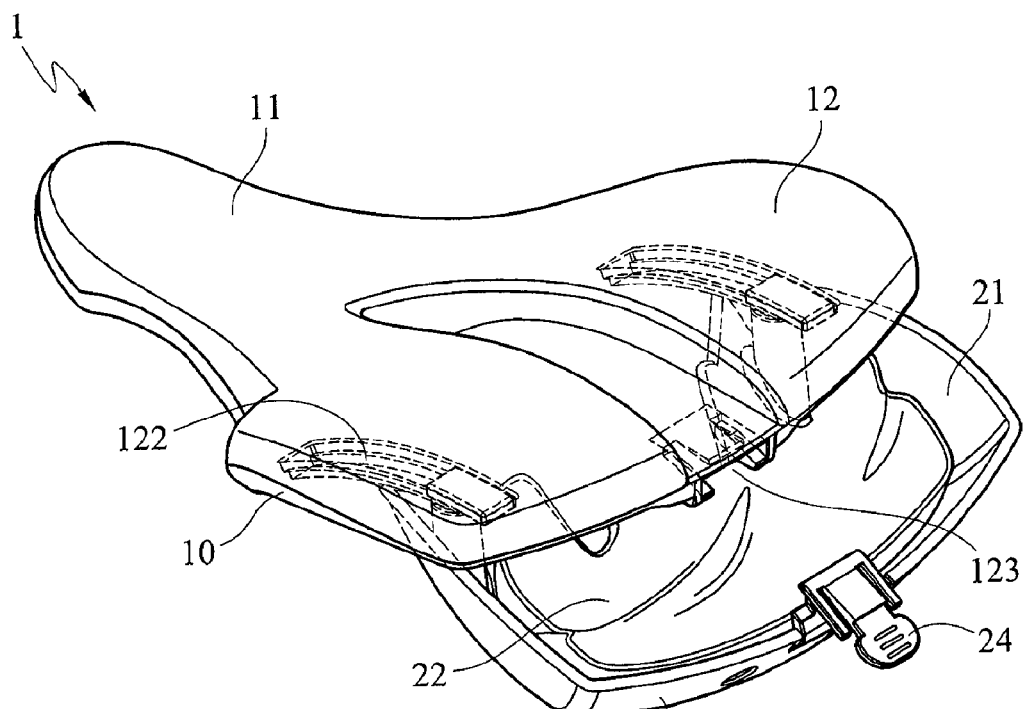
FIG. 2A is a top view of the cycle saddle structure of this invention in an open position.
Figure 2B:
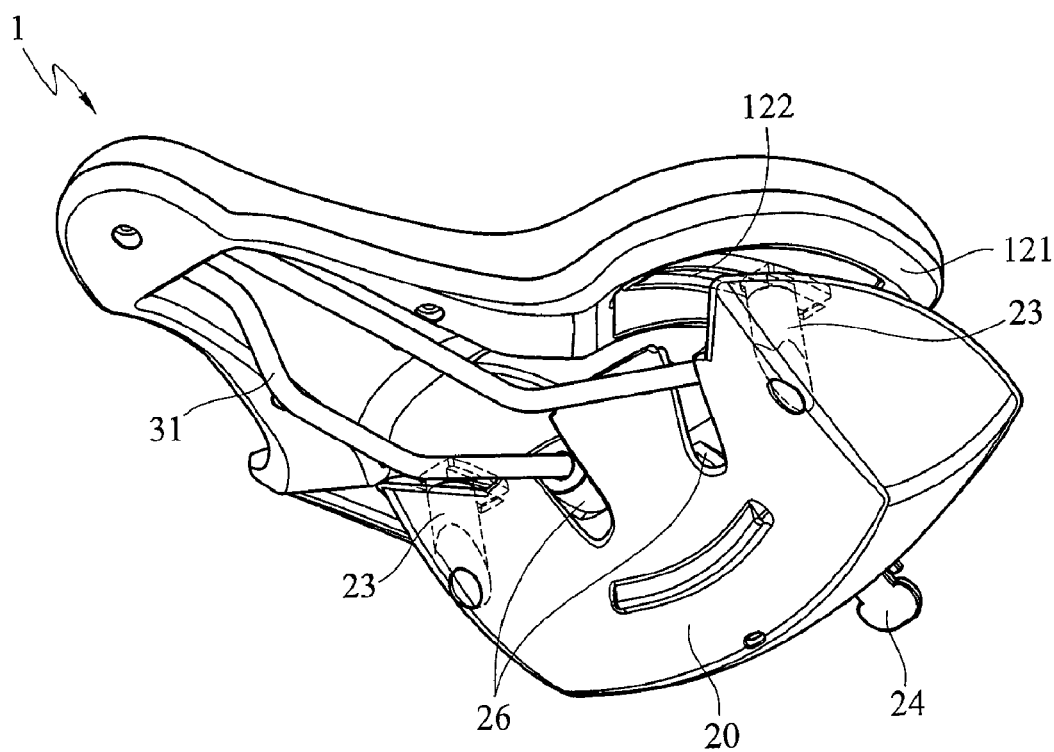
FIG. 2B is a bottom view of the cycle saddle structure of this invention in the open position.

FIGS. 2A and 2B illustrate the container 20 in the open position. The container 20 comprises a continuous wall 21 to define a containing space 22 for receiving the rider's articles. In this invention, the container 20 is capable of sliding onto the rear supporting portion 12 at a bottom portion 121 thereof, so that the container 20 is adapted to slide between the closed position and the open position with respect to the base 10. The container is adapted to slide rearward or sideward from the closed position to the open position, and this invention is not limited to either of those positions. This embodiment will be described with reference to an example where the container is adapted to slide in the rear direction. However, a container that is adapted to slide sideways (not shown in the figures) will readily occur to those of ordinary skill in the art, and would still fall within the scope of this invention.

In this embodiment, the base 10 comprises a pair of sliding grooves 122 formed on the bottom portion 121 of the rear supporting portion 12 in parallel with each other. The container 20 comprises a pair of sliding elements 23 extending upwards and is partially embedded in the pair of sliding grooves 122 respectively in such a way so the container 20 is adapted to slide between the open position and the closed position with respect to the base 10. It should be noted that although only a pair of sliding grooves 122 and sliding elements 23 are illustrated in this embodiment, this invention is not just limited to these components. Those of ordinary skill in the art may adopt other methodologies to accomplish the sliding motion. For example, a single sliding groove 122 in conjunction with a single sliding element 23 may be used instead.

Additionally, the cycle saddle structure 1 may further comprise a supporting apparatus disposed on the base 10 at the bottom portion 121 so that the supporting apparatus is connected to the base 10 from the front crotch portion 11 to the rear supporting portion 12 for securing the base 10 to a frame (not shown). In more detail, the supporting apparatus comprises a pair of rails 31 to smoothly slide the container 20. The container 20 further comprises a pair of through holes 26 which are adapted to allow the pair of rails 31 to pass through when the container 20 slides from the opened position towards the closed position.

To secure the container 20 to the cycle saddle structure 1 when the container 20 is in the closed position, the base 10 may have a notch 123. The container 20 may further comprise a corresponding fastener 24. In this embodiment, the notch 123 is disposed on the bottom portion 121 of the rear supporting portion 12 at the central portion. The fastener 24 is disposed at the central portion of the peripheral of the container 20. The fastener 24 is adapted to engage in the notch 123 when the container 20 is in the closed position.

Figure 3:
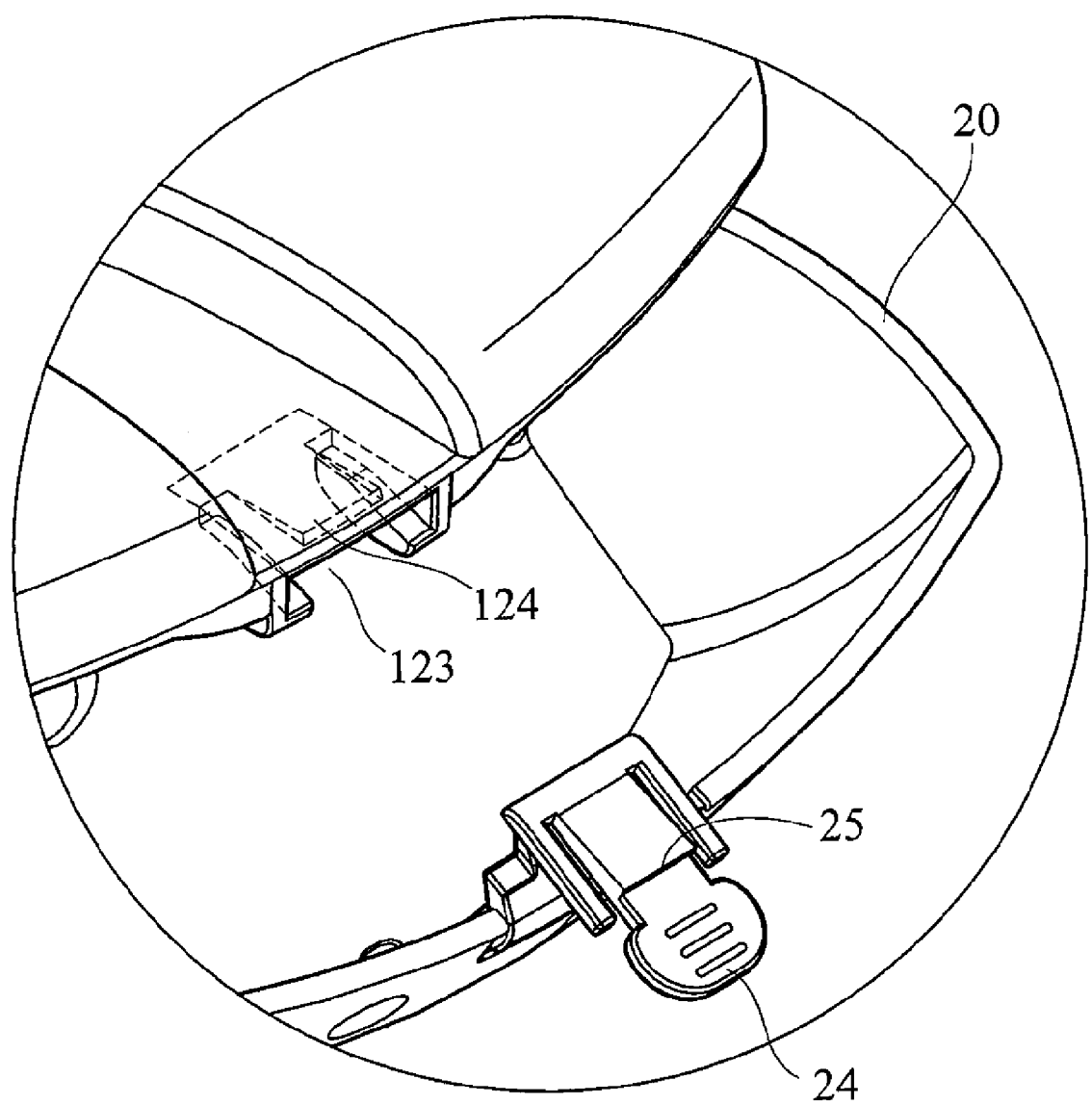
FIG. 3 is an enlarged schematic view of a fastener in the cycle saddle structure of this invention.

FIG. 3 shows an enlarged schematic view of the fastener 24 and the notch 123. The fastener 24 comprises a protruding flange 25 extending upwards, while the rear supporting portion 12 comprises a stop flange 124 extending downwards in the notch 123. When the container 20 is in the closed position, the protruding flange 25 is adapted to abut against the stop flange 124.

Figure 4:
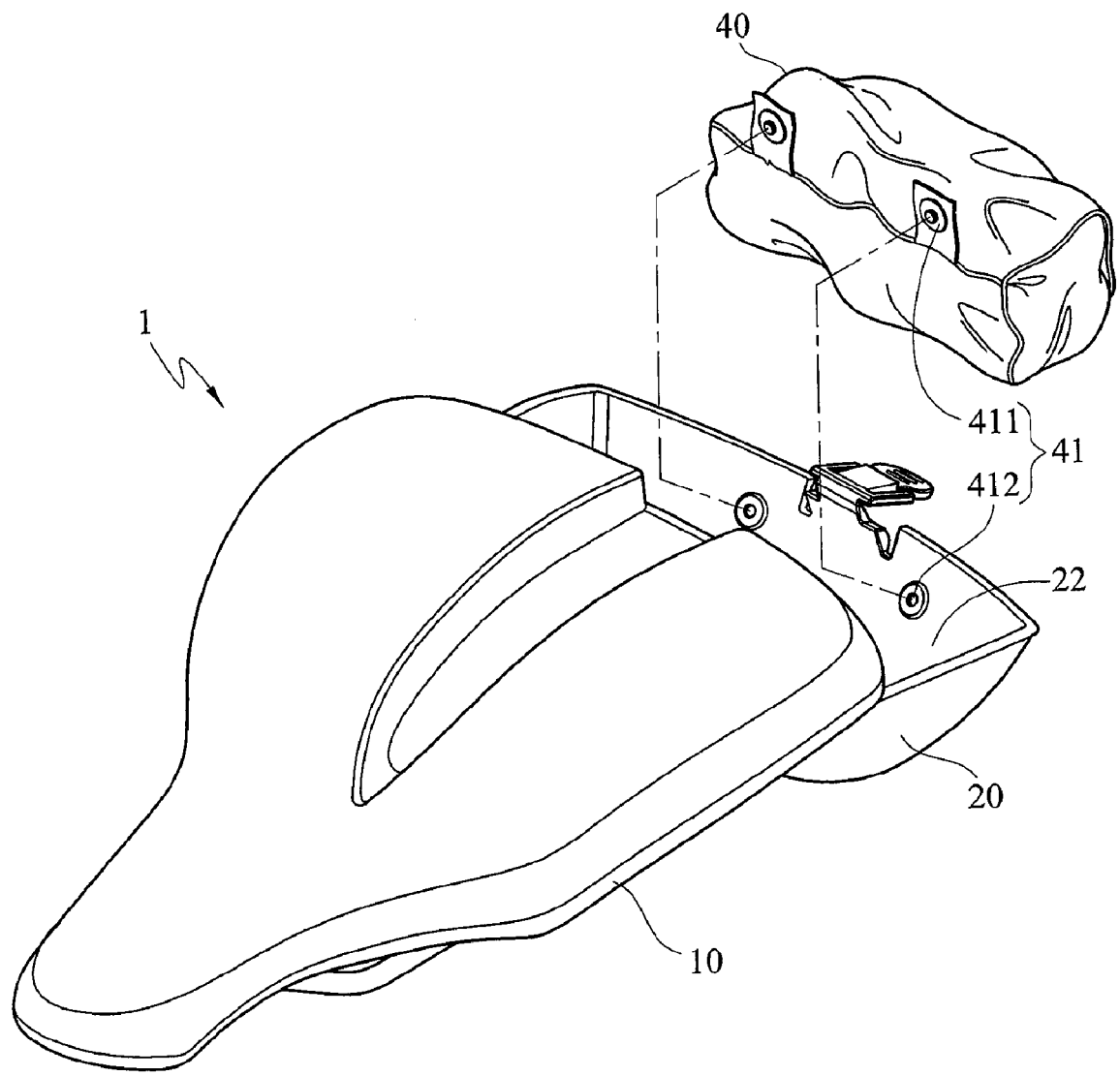
FIG. 4 is a schematic view of the cycle saddle structure with a soft bag.

The cycle saddle structure 1 of this invention may further be used in conjunction with other accessories to provide a better effect. Another embodiment of this invention is depicted in FIG. 4. The cycle saddle structure 1 further comprises a soft bag 40 independently disposed in the containing space 22. A fastener 41 may be further included and disposed between the soft bag 40 and the continuous wall 21 of the container 20. For instance, the fastener 41 may be a buckle which may include a male connector 411 and a female connector 412 disposed on the soft bag 40 and the continuous wall 21 of the container 20 respectively, for detachably connecting the soft bag 40 and the container 20.

In summary, because the cycle saddle structure of this invention has a containing space that can be easily opened, the rider can more conveniently access the articles contained therein without having to stop the cycle.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A cycle saddle structure comprising:
   a base having a front crotch portion and a rear supporting portion connecting with the front crotch portion;
   a supporting apparatus being disposed on the base at a bottom portion thereof, wherein the supporting apparatus comprises a pair of rails; and
   a container being capable of sliding onto the rear supporting portion at a bottom portion thereof, wherein the container comprises a pair of through holes to allow the pair of rails passing therethrough, thereby the container is adapted to slide between an open position and a closed position with respect to the base.

2. The cycle saddle structure as claimed in claim 1, wherein the container comprises a continuous wall to define a containing space.

3. The cycle saddle structure as claimed in claim 2, further comprising a soft bag independently disposed in the containing space.

4. The cycle saddle structure as claimed in claim 3, further comprising a fastener disposed between the soft bag and the continuous wall of the container.

5. The cycle saddle structure as claimed in claim 4, wherein the fastener is a buckle which includes a male connector and a female connector, disposed on the soft bag and the continuous wall of the container respectively, for detachably connecting the soft bag and the container.

6. The cycle saddle structure as claimed in claim 2, wherein the container is adapted to slide rearward from the closed to the open position.

7. The cycle saddle structure as claimed in claim 6, wherein the base comprises a sliding groove formed on the bottom portion of the rear supporting portion, and the container comprises a sliding element extending upwards and being partially embedded in the sliding groove in such a way that the container is adapted to slide between the open position and the closed position.

8. The cycle saddle structure as claimed in claim 6, wherein the base comprises a pair of sliding grooves in parallel formed on the bottom portion of the rear supporting portion, and the container comprises a pair of the sliding elements extending upwards and being partially embedded in the pair of sliding grooves, respectively, in such a way that the container is adapted to slide between the open position and the closed position.

9. The cycle saddle structure as claimed in claim 8, wherein the base further comprises a notch, and the container further comprises a fastener adapted to engage in the notch when the container is in the closed position thereof.

10. The cycle saddle structure as claimed in claim 9, wherein the notch is disposed on the bottom portion of the rear supporting portion at a central portion thereof, and the fastener comprises a protruding flange extending upwards and the rear supporting portion comprises a stop flange extending downwards, whereby the protruding flange is adapted to abut against the stop flange when the container is in the closed position thereof.

11. The cycle saddle structure as claimed in claim 1, wherein the supporting apparatus connects to the base and extends from the front crotch portion to the rear supporting portion for securing the base to a frame.

* * * * *